(12) United States Patent
Noda

(10) Patent No.: US 11,112,866 B2
(45) Date of Patent: Sep. 7, 2021

(54) ELECTRONIC DEVICE

(71) Applicant: KYOCERA Corporation, Kyoto (JP)

(72) Inventor: Akiyoshi Noda, Tokyo (JP)

(73) Assignee: KYOCERA CORPORATION, Kyoto (JP)

(\*) Notice: Subject to any disclaimer, the term of this patent is extended or adjusted under 35 U.S.C. 154(b) by 0 days.

(21) Appl. No.: 16/574,022

(22) Filed: Sep. 17, 2019

(65) Prior Publication Data

US 2020/0057494 A1 Feb. 20, 2020

Related U.S. Application Data

(63) Continuation of application No. 15/547,255, filed as application No. PCT/JP2016/052525 on Jan. 28, 2016, now abandoned.

(30) Foreign Application Priority Data

Jan. 29, 2015 (JP) .............................. JP2015-015700

(51) Int. Cl.
| | |
|---|---|
| *G09G 5/00* | (2006.01) |
| *G06F 3/01* | (2006.01) |
| *G06F 3/0481* | (2013.01) |
| *G06F 3/0482* | (2013.01) |
| *G06F 1/16* | (2006.01) |

(Continued)

(52) U.S. Cl.
CPC .............. *G06F 3/013* (2013.01); *G06F 1/163* (2013.01); *G06F 3/011* (2013.01); *G06F 3/017* (2013.01); *G06F 3/0481* (2013.01); *G06F 3/0482* (2013.01); *G06F 3/04842* (2013.01); *G06F 3/04845* (2013.01); *G01C 21/20* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 8,434,868 B2 | 5/2013 | Sato et al. | |
| 9,665,171 B1 | 5/2017 | Skogo et al. | |
| 10,469,916 B1 * | 11/2019 | Teller | ............... H04N 21/25883 |

(Continued)

FOREIGN PATENT DOCUMENTS

| | | |
|---|---|---|
| JP | 10-222287 A | 8/1998 |
| JP | 2000-89884 A | 3/2000 |

(Continued)

OTHER PUBLICATIONS

International Search Report in PCT/JP2016/052525, dated Mar. 1, 2016.

(Continued)

*Primary Examiner* — Adam R. Giesy
(74) *Attorney, Agent, or Firm* — Hauptman Ham, LLP

(57) ABSTRACT

An electronic device according to the present application includes a display and a controller configured to determine a user's gaze position in a display area of the display based on user's gaze movement. In a state where a first image as an object is displayed in the display area, the controller is configured to hide the first image as the object when the gaze position separates from an area of the first image by a predetermined distance in a direction away from the first image as the object.

4 Claims, 11 Drawing Sheets

(51) Int. Cl.
    *G06F 3/0484*    (2013.01)
    *G01C 21/20*     (2006.01)

(56) References Cited

U.S. PATENT DOCUMENTS

| | | |
|---|---|---|
| 2015/0370338 A1 | 12/2015 | Naruse |
| 2016/0054795 A1 | 2/2016 | Sasaki |
| 2016/0077586 A1 | 3/2016 | Taguchi |
| 2017/0325907 A1 | 11/2017 | Maeda et al. |

FOREIGN PATENT DOCUMENTS

| | | |
|---|---|---|
| JP | 2009-15610 A | 1/2009 |
| JP | 2011-125692 A | 6/2011 |
| WO | 2014/125823 A1 | 8/2014 |
| WO | 2014/207828 A1 | 12/2014 |

OTHER PUBLICATIONS

Office Action in JP Application No. 2016-572152, dated Mar. 6, 2018, for which an explanation of relevance is attached, 3pp.

\* cited by examiner

FIG.5

| PATTERN | CONTENTS OF INPUT OPERATION | OUTPUT CONTENTS |
|---|---|---|
| 1 | LOOKING STRAIGHT | NO OUTPUT |
| 2 | GAZE MOVEMENT IN PREDETERMINED DIRECTION | MOVEMENT OF OBJECT IN PREDETERMINED DIRECTION AND SPECIFICATION OF PREDETERMINED POSITION |
| 3 | GAZE AFTER GAZE MOVEMENT IN PREDETERMINED DIRECTION | EXECUTION OF PREDETERMINED PROCESSING |
| 4 | MULTIPLE BLINKS | EXECUTION OF PREDETERMINED PROCESSING |

ELECTRONIC DEVICE

CROSS-REFERENCE TO RELATED APPLICATIONS

The present application is continuation of U.S. patent Ser. No. 15/547,255 filed on Jul. 28, 2017, which is a National Phase of International Application Number PCT/JP2016/052525, filed Jan. 28, 2016, which claims priority to Japanese Application Number 2015-015700, filed Jan. 29, 2015.

FIELD

The present invention relates to an electronic device capable of performing a predetermined input according to a user's eyes movement.

BACKGROUND

Recently, as the electronic device, a head-mounted display is known, the head-mounted display including a display unit for displaying an image and a mouse, a gaze detection device for detecting a user's gaze direction, and a display control unit for moving the mouse displayed on the display unit to the detected gaze direction.

SUMMARY

Solution to Problem

An electronic device according to one aspect includes a display, and a controller configured to estimate a user's gaze position in a display area of the display based on user's gaze movement. In a state where a first image is displayed in the display area, the controller is configured to hide the first image when the gaze position separates from an area of the first image by a predetermined distance in a direction away from the first image.

An electronic device according to one aspect includes a display including a first display area and a second display area, and a controller configured to estimate a user's gaze position in the display based on user's gaze movement. In a state where a first image is displayed in the second display area, the controller is configured to hide the first image when the gaze position separates from the second display area by a predetermined distance.

An electronic device according to one aspect includes a display, and a controller configured to estimate a user's gaze position in a display area of the display based on user's gaze movement. The controller is configured to set a first range and a second range that includes the first range in the display area, the second range being larger than the first range, and hide the first image when the gaze position moves to an outside of the second range while the first image is displayed in the first range.

An electronic device according to one aspect includes a display, and a controller configured to estimate a user's gaze position in a display area of the display based on user's gaze movement. The controller is configured to display a first image on a first direction side in the display area when the gaze position moves in the first direction by a first distance, and hide the first image when the gaze position moves in a second direction opposite to the first direction by a second distance while the first image is displayed, the second distance being longer than the first distance.

An electronic device includes a display configured to display a first image, and a controller configured to estimate a user's gaze position in a display area of the display based on user's gaze movement. When a ratio of an area of the first image to the display area is less than a predetermined value, the controller is configured to hide the first image when the gaze position separates from the area of the first image by a predetermined distance.

BRIEF DESCRIPTION OF DRAWINGS

FIG. 5 is a diagram illustrating an example of combinations of predetermined user's eyes movements and processing patterns associated with the eyes movements according to one embodiment.

DETAILED DESCRIPTION

Exemplary embodiments for implementing the present application will be explained in detail below with reference to the accompanying drawings. It should be noted that the present application is not limited by the following explanation. In addition, the components in the explanation below include those which are easily thought of by persons skilled in the art, those which are substantially equivalents, and those in a scope of so-called equivalents. In the head-mounted display, it is desirable to propose a novel input mode that further improves operability at the time of input. An object of the present application is to provide an electronic device further improved in operability in the electronic device capable of performing a predetermined input according to an eyes movement.

Figure 1:
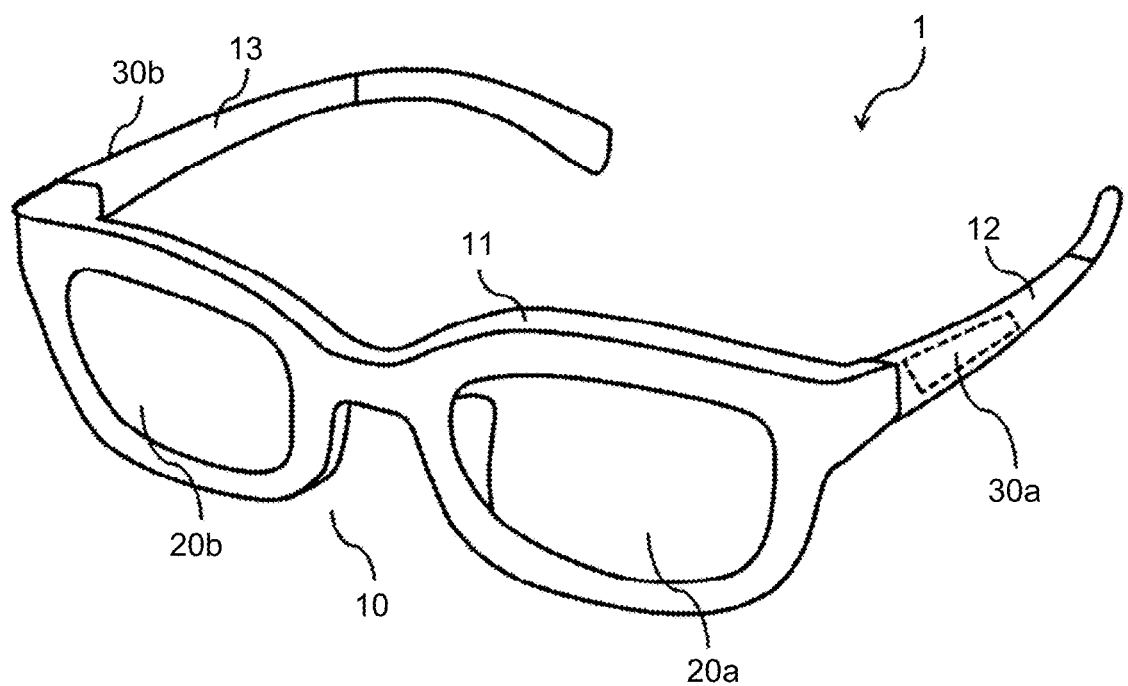
FIG. 1 is a diagram illustrating an example of a schematic configuration of an electronic device 1 according to one embodiment.

FIG. 1 is a diagram illustrating an example of a schematic configuration of the electronic device 1 according to one embodiment. The electronic device 1 illustrated in FIG. 1 includes a wearing portion 10 that is wearable on the head of a user, a display 20 mounted on the wearing portion 10 and provided in front of user's eyes, and an operation unit 30 partially mounted on the wearing portion 10. The display 20 can display an image in part or whole area of the display 20 so that the user can visually recognize the image.

As illustrated in FIG. 1, the electronic device 1 has an eyeglass shape or a goggle shape. The wearing portion 10 of the electronic device 1 includes a front part 11 and side parts 12 and 13. When the wearing portion 10 is worn on the user's head, the front part 11 is arranged in front of the user's eyes, and the side parts 12 and 13 are arranged along side portions of the user's head.

As explained above, the front part 11 is a portion arranged in front of the user's eyes when worn on the user's head. The front part 11 is configured so that a bridge is integrated with two marginal parts, so-called rims, provided in right and left sides across the bridge. The bridge is a portion that is in contact with a user's nose when the electronic device 1 is worn, and has a shape recessed along the user's nose. The marginal parts support the display 20. The marginal parts are connected to the side parts 12 and 13.

As explained above, when worn on the user's head, the side parts 12 and 13 are portions arranged along the both side portions of the user's head, so-called temple parts of the eyeglasses. One edge of each of the side parts 12 and 13 are connected to one edge of the front part 11. Here, a spring for pressure adjustment and an adjuster for changing an angle are arranged at the hinge portion of the temple of the eyeglasses which is the end portion of the side part 12 connected to the front part 11 in order to match user's feeling.

The display 20 includes a first display part 20a and a second display part 20b which are a pair of display parts provided in front of the user's right and left eyes. Each periphery of the first display part 20a and the second display part 20b of the display 20 is surrounded with the marginal part of the front part 11.

The display 20 can use a display panel such as an LCD (Liquid Crystal Display) and an OELD (Organic Electro-Luminescence Display) panels. For the display 20, the display panel is preferably made of a translucent or transparent plate-like member. By making the display panel of the display 20 with the translucent or transparent plate-like member, it is possible for the user to see the view through the display 20.

The operation unit 30 is provided in the side parts 12 and 13 respectively. The operation units 30 are touch sensors 30a and 30b which detect respective contacts. Various types of sensors such as a capacitive type sensor, an ultrasonic type sensor, a pressure sensitive type sensor, a resistive film type sensor, and an optical detection type sensor can be used for the touch sensors 30a and 30b. In the electronic device 1, the operation unit 30 may be configured to have only either one of the touch sensors 30a and 30b.

Figure 2:
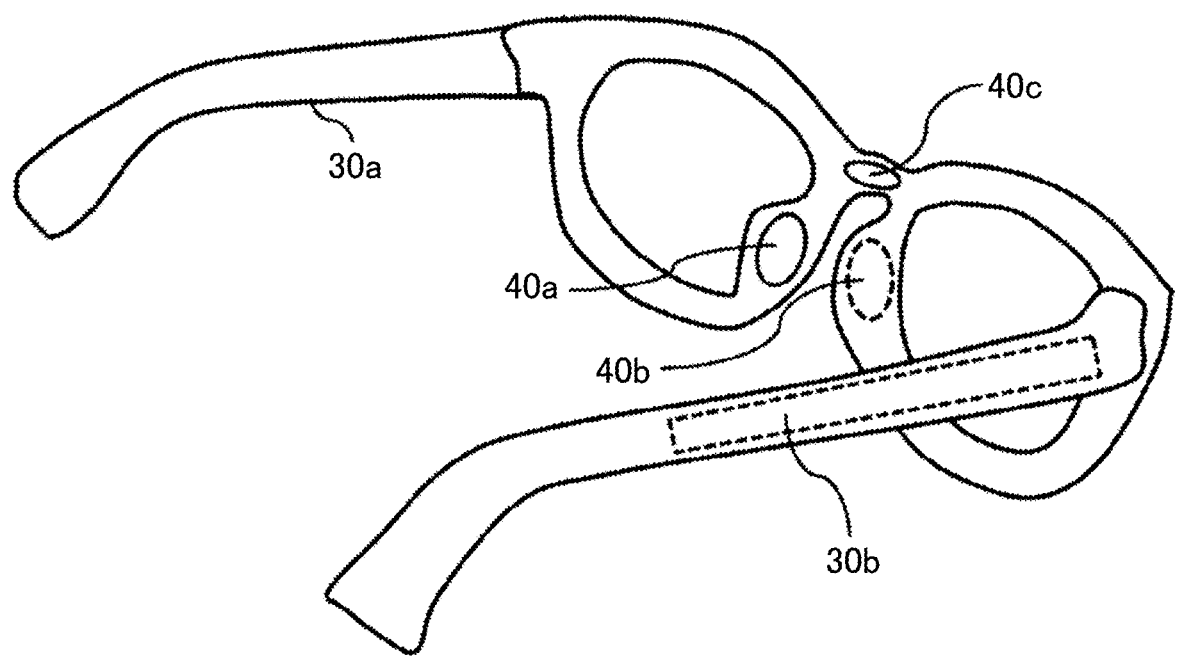
FIG. 2 is a diagram illustrating an example of a rear side of the electronic device 1 according to one embodiment.

FIG. 2 is a diagram illustrating an example of a rear side of the electronic device 1 according to one embodiment. The electronic device 1 includes a myoelectric sensor as a detector 40 which is explained later.

The myoelectric sensor has electrodes provided at locations contactable with areas around the user's eyes. The myoelectric sensor detects myoelectric potentials generated in association with user's eyes movements including, for example, blinking or gaze movement. As a measuring electrode to measure a myoelectric potential, a first electrode 40a and a second electrode 40b respectively contactable with the right and left sides of the user's nose are provided at nose pads extending from the bridge of the wearing portion 10. As a reference electrode, a third electrode 40c contactable with the center of the user's nose is provided on the bridge. With such a configuration, the myoelectric sensor detects changes in potentials of the first electrode 40a and of the second electrode 40b based on the third electrode 40c, for example, when the user moves the eyes in a predetermined direction or when he/she is blinking.

The third electrode 40c as the reference electrode used for the myoelectric sensor may be provided at a location different from the bridge. For example, the third electrode 40c may be provided near an end portion opposite to the front part 11 on the side part 12 or the side part 13. The arrangement configuration of the electrodes are not limited thereto, and various known technologies may be applied.

Although FIG. 2 illustrates the configuration in which the electronic device 1 includes the myoelectric sensor as the detector 40, the detector 40 is not limited to the myoelectric sensor.

Figure 3:
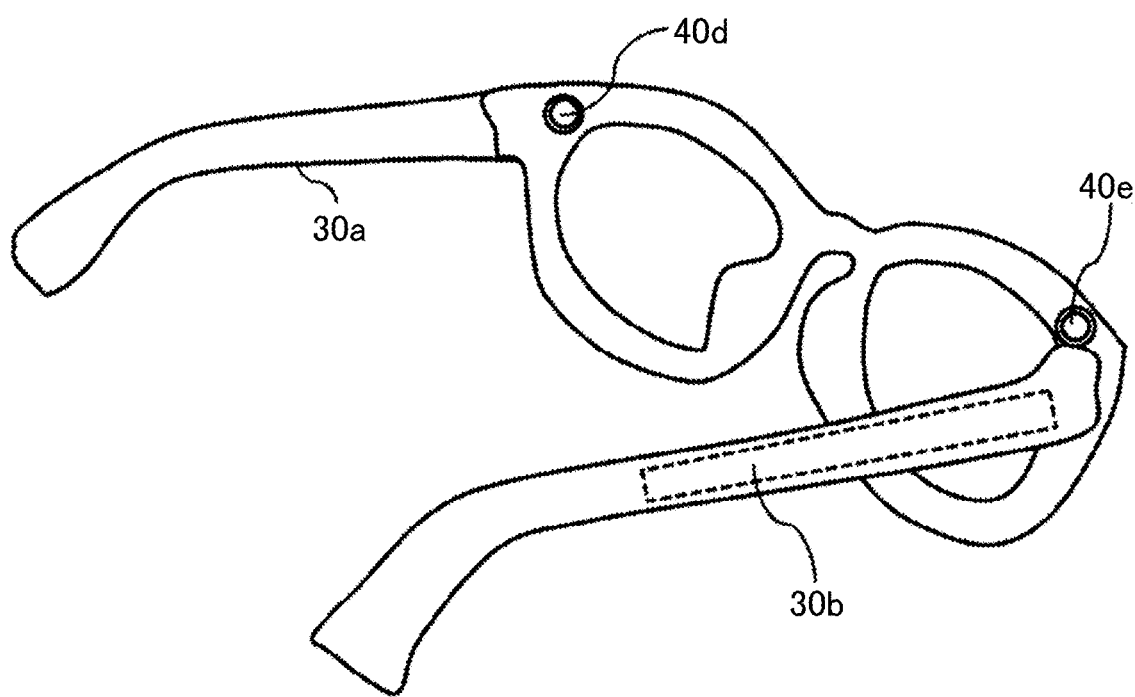
FIG. 3 is a diagram illustrating an example of a rear side of another electronic device 1 according to one embodiment.

FIG. 3 is a diagram illustrating an example of a rear side of the electronic device 1 according to one embodiment. The electronic device 1 includes an imager as the detector 40.

The imager is provided in the front part 11 of the electronic device 1 so as to face a user's face. The imager is respectively provided near the right and left end portions of the front part 11. The respective imagers are referred to as 40d and 40e. The imager has a lens system including an imaging lens, an aperture, a zoom lens, a focus lens, and the like; a drive system causing a focus operation and a zoom operation to be performed on the lens system; and a solid-state imaging element array that photoelectrically converts an imaging light obtained by the lens system to generate an imaging signal, for example. The solid-state imaging element array may be implemented by, for example, a CCD (Charge Coupled Device) sensor array and a CMOS (Complementary Metal Oxide Semiconductor) sensor array.

Figure 4:
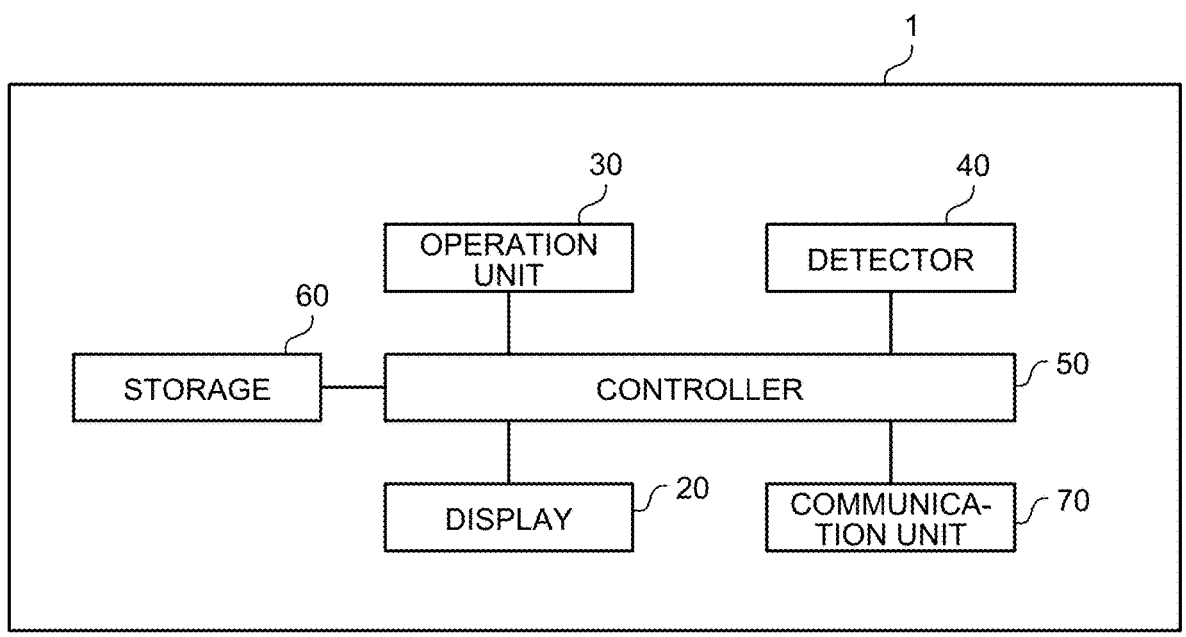
FIG. 4 is a diagram illustrating an example of a functional block of the electronic device 1 according to one embodiment.

Functions of the electronic device 1 will be explained next with reference to FIG. 4. FIG. 4 is a diagram illustrating an example of a functional block of the electronic device 1 according to one embodiment. As illustrated in FIG. 4, the electronic device 1 includes the display 20, the operation unit 30, the detector 40, a controller 50, a storage 60, and a communication unit 70.

The display 20 can display videos and images based on control by the controller 50. It suffices that the display 20 can display an image that the user can visually recognize, that is, it is sufficient that the display 20 can present an image to the user, and therefore various configurations can be used. For example, the display 20 may be configured to project an image to a display panel or a screen like a projector. When an image is to be projected, it may be configured to scan a laser light to project an image, or it may be configured to transmit light through a liquid crystal panel to project an image. Moreover, it may be configured to display an image to the user by irradiating a laser light directly from the display 20 toward the user.

As explained above, the operation unit 30 is a touch sensor provided on, for example, the side parts 12 and 13 of the electronic device 1. The operation unit 30 detects a position where a user's finger touches each of the side parts 12 and 13 as an input position. The operation unit 30 outputs a signal according to the detected input position to the controller 50. Thus, the user can perform various touch operations for the electronic device 1. As types of the touch operation, for example, there are an operation of releasing a finger within a short period of time after the finger is brought into contact with each of the side parts 12 and 13, an operation of flicking fingers at each of the side parts 12 and 13 in an arbitrary direction, e.g., a longitudinal direction of the side part, and an operation of moving fingers in the longitudinal direction of the side part while keeping the fingers in contact with each of the side parts 12 and 13. The direction in which the finger is moved is not limited thereto, and a contact movement of the finger in a lateral direction of the side part may be applied as a predetermined operation. Moreover, a contact movement of the finger in a longitudinal direction of the side part and a movement of the finger in the lateral direction of the side part may be detected together. When the side part is constituted from a plurality of faces, a predetermined operation may be detected based on a plurality of contacts with respect to the faces, for example, based on movement of a plurality of contact positions in directions approaching each other.

The operation unit 30 is not limited to the touch sensor, and may be, for example, one or more buttons.

When the detector 40 is the myoelectric sensor, as explanation above, the detector 40 detects a change in myoelectric potential when the user moves the eyes in a predetermined direction or when he/she is blinking. The myoelectric sensor outputs the information of the detected change in the myoelectric potential to the controller 50.

On the other hand, when the detector 40 is the imager, the imager captures images of the user's eyes. The imager outputs image data acquired through capturing or a series of image data acquired through capturing at each predetermined time, e.g., 1/15 sec. to the controller 50 as moving-image data.

The controller 50 includes, for example, an MPU (Micro Processing Unit). The controller 50 can execute various types of processing of the electronic device 1 according to the procedure instructed by software. In other words, the controller 50 can execute processing by sequentially reading instruction codes from an operating system program, a program of an application, or the like. Thus, the controller 50 can control the operations of the units, and outputs a control signal or an image signal for displaying data required for the units such as a video and an image on the display 20.

The controller 50 can estimate or detects a user's eyes movement based on the information of the change in the myoelectric potential output from the myoelectric sensor as the detector 40. The eyes movement corresponds to the presence or absence of blink, or the presence or absence of gaze movement including also changes of a gaze direction and a gaze position, or the like.

Alternatively, the controller 50 can estimate the user's eyes movement by extracting the eyes as a subject included in the image data or in the moving-image data output from the imager as the detector 40 and analyzing the movement of the eyes as the subject. The eyes movement corresponds to the presence or absence of blink, or the presence or absence of gaze movement including changes of a gaze direction and a gaze position, or the like. For example, the controller 50 can estimate the presence or absence of a gaze movement by extracting the eyes as a subject included in the image data or in the moving-image data and further performing predetermined processing such as calculation of the center of an iris region on the extracted subject. As the method of extracting a subject from an image, various image processing technologies can be used.

The storage 60 includes, for example, a nonvolatile storage device, a nonvolatile semiconductor memory such as ROM (Read Only Memory), a hard disk drive etc., and a readable/writable storage device such as SRAM (Static Random Access Memory) and DRAM (Dynamic Random Access Memory), and stores various programs. The storage 60 previously stores user's eyes movement patterns which can be estimated from the information output from the detector 40 and a plurality of display processing patterns associated with the respective movement patterns.

The communication unit 70 includes an antenna and an RF circuitry and performs communications including, for example, telephone communication and information communication with an external device based on the control by the controller 50.

An example in which the electronic device 1 detects a predetermined user's eyes movement and thereby performs predetermined processing associated with the movement, that is, an example in which a predetermined operation is performed will be explained below with reference to FIG. 5 to FIG. 10D. FIG. 5 is a diagram illustrating an example of combinations of predetermined user's eyes movements according to one embodiment and processing patterns associated with the eyes movements. FIG. 5 represents an example of combinations of predetermined user's eyes movements and processing patterns respectively associated with the eyes movements, which are stored in the storage 60. FIG. 6A to FIG. 10D are diagrams illustrating examples of the display mode of the display 20 in the electronic device 1 based on the predetermined processing patterns illustrated in FIG. 5.

In Pattern 1, the user is in a state of "looking straight" at the display and does not perform any predetermined eyes movement. In this case, the controller 50 does not recognize an input operation by the user and therefore does not perform any particular processing.

"Gaze movement in a predetermined direction" in Pattern 2 is associated with, for example, processing (operation) for moving a predetermined object displayed on the display 20 in a predetermined direction in a displayed image. Moreover, "gaze movement in a predetermined direction" may be associated with, for example, processing for specifying a predetermined position in the displayed image. In addition, "gaze movement in a predetermined direction" may be associated with, for example, processing for displaying a new image in a display area of the display 20.

An action of "gaze after gaze movement in a predetermined direction" in Pattern 3 is associated with, for example, an operation for causing the electronic device 1 to execute predetermined processing. For example, when the user's gaze position moves to a position overlapping with a predetermined operation icon displayed on the display 20 and thereafter continues to overlap with the operation icon for a predetermined time, e.g., 1 sec. or more, it is regarded that the operation icon is selected, and the predetermined processing associated with the operation icon is executed.

An action of "multiple blinks" in Pattern 4 is associated with, for example, an operation for causing the electronic device 1 to execute predetermined processing. For example, when the user blinks a few times while the user's gaze position overlaps with the predetermined operation icon displayed on the display 20, it is regarded that the operation icon is selected, and the predetermined processing associated with the operation icon is executed. In addition, the blinks may be assigned to an operation for implementing an I/O operation such as activation or stop of the electronic device 1, shift to a sleep state or its cancel, and execution or stop of music reproduction in a music application.

An example of executing predetermined processing based on detection of a predetermined eyes movement will be explained next. FIG. 6A, FIG. 6B, FIG. 6C, and FIG. 6D are diagrams illustrating examples of the display mode of the display 20 of the electronic device 1. As is the electronic device 1 illustrated in FIG. 1, the shape of the display 20 may include curved portions, however, FIG. 6A, FIG. 6B, FIG. 6C, and FIG. 6D represent a rectangular area obtained by extracting a part of the display 20 as a display area 21.

Figure 6A:
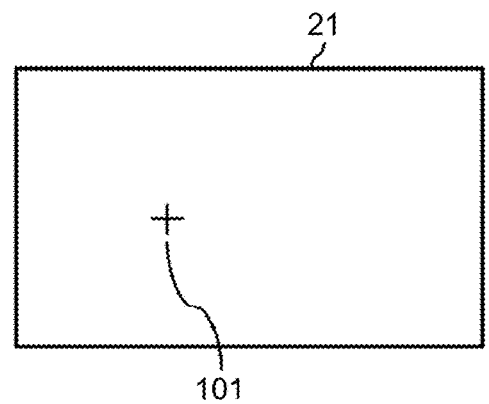
FIG. 6A is a diagram illustrating an example of a display mode of a display 20 of the electronic device 1.

The state illustrated in FIG. 6A is a state in which the display 20 does not display any image, and the state corresponds to Pattern 1 in FIG. 5, for example, when the user is in the state of "looking straight". At this time, the controller 50 can detect the user's gaze position in the display area 21 of the display 20 based on the detection result of the detector 40. The user's gaze position is displayed as a cross icon 101 in FIG. 6A. Incidentally, in the electronic device 1, it is not always necessary to display the gaze position so that the user can visually recognize the gaze position, and it is sufficient to simply detect the gaze position. In some embodiments, explanation will be given on the assumption that the icon 101 simply indicates the gaze position.

Figure 6B:
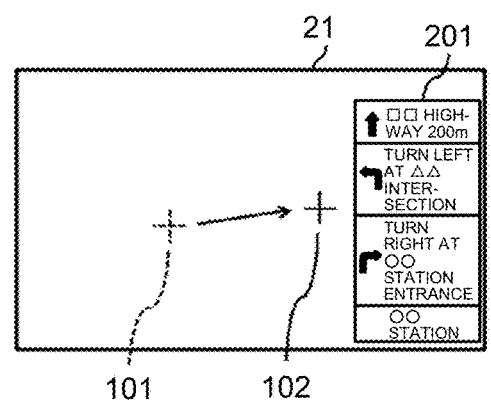
FIG. 6B is a diagram illustrating an example of the display mode of the display 20 of the electronic device 1.

The controller 50 can determine that the user's gaze position moves from the state at the position 101 illustrated in FIG. 6A to a position 102 illustrated in FIG. 6B, and this causes a first image as an object 201 to be displayed in the display area 21. As illustrated in FIG. 6B, the gaze position 101 before the gaze position is moved is indicated by a broken line, and the gaze position 102 after the gaze position is moved is indicated by a solid line. The same goes for the following case, and when describing the movement of the gaze position, the gaze position before the movement is indicated by the broken line and the gaze position after the movement is indicated by the solid line. When estimating the movement of the gaze position, the controller 50 can determine the movement direction of the position and displays the object 201 at a position in the display area 21 based on the determined direction. In the example of FIG. 6B, based on a substantially right direction (hereinafter, called "first direction") which is an determined direction from the position 101 to the position 102, the object 201 is displayed on the first direction side which is the right direction side in the display area 21.

The object 201 illustrated in FIG. 6B is an image for providing walking guidance to the user. The object 201 indicates a route from an arbitrary departure point to an arbitrary destination point. The object 201 includes an arrow icon indicating a direction in which the user should travel or indicating a corner at which the user should turn, and also includes character information accompanying the arrow icon. The object 201 may be displayed by superimposing, for example, opaque characters on a colored transparent image or by superimposing opaque characters on an opaque image.

Figure 6C:
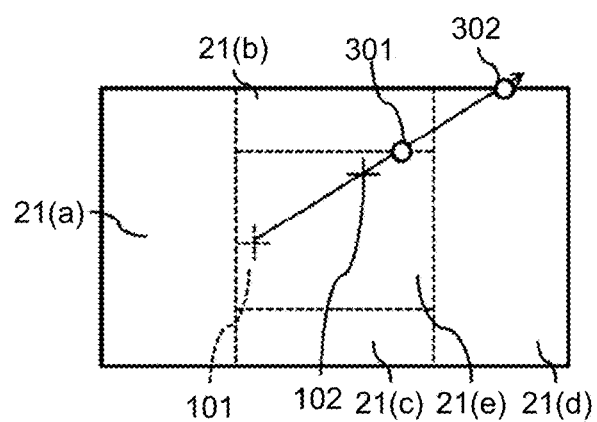
FIG. 6C is a diagram illustrating an example of the display mode of the display 20 of the electronic device 1.

Here, the movement direction of the gaze position and the display position of the object 201 based on the movement direction may be appropriately defined. For example, the movement direction is defined as four directions of left, right, up, and down, a movement vector component of the gaze position is resolved into components in the four directions, and the display position of the object 201 may be determined based on the direction in which the moved component is the largest among the four directions. When the display area 21 is rectangular, a lateral direction may be defined as a direction parallel to its lower side or upper side, or may be defined as a horizontal direction, or may be defined as a direction in which the first display part 20a and the second display part 20b are arranged. Moreover, the movement direction of the gaze position may be defined as eight directions with an azimuth interval of 45° instead of the four directions of left, right, up, and down with an azimuth interval of 90°. In addition, it may be configured to define the display area 21 as areas obtained by dividing the area into a plurality portions and to display the object 201 in an area intersecting the movement direction of the gaze position. FIG. 6C illustrates a schematic diagram when the display area 21 is defined by being divided into five portions. The five divided areas include, for example, four areas 21(a) to (d) including edges of the display area 21 and an area 21(e) including the center thereof. Here, when the gaze position moves from the position 101 to the position 102, an intersection between the movement direction and any of the areas 21(a) to (d) is determined, and the object 201 is displayed in the area where the intersection is determined. Here, as the intersection between any of the four areas 21(a) to (d) and the movement direction of the gaze position, a point determined inside the display area 21 may be applied, or a point determined outside the display area 21 may be applied. Specifically, for example, a point 301 determined inside the display area 21 is applied, so that the object 201 may be displayed in the area 21(b) including the point 301, while a point 302 determined outside the display area 21 is applied, so that the object 201 may be displayed in the area 21(d) including the point 302.

In this way, the electronic device 1 has a configuration that estimates the user's gaze position in the display area 21 of the display 20 based on the detection result of the detector 40 that detects an movement operation of the user's eyes, and that displays the first image on the first direction side in the display area 21 when the gaze position moves in the first direction. Therefore, it is possible to display useful information near the position visually recognized by the user in the display area 21.

Figure 6D:
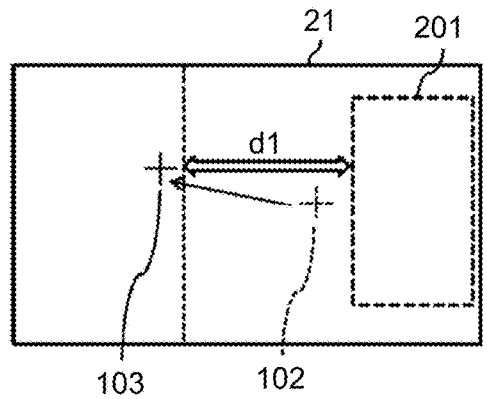
FIG. 6D is a diagram illustrating an example of the display mode of the display 20 of the electronic device 1.

Referring again to FIG. 6B, as illustrated in FIG. 6B, when the controller 50 can determine that the gaze position separates from the area of the object 201 by a predetermined distance d1, while the first image as the object 201 is displayed, in a direction from the position 102 to a position 103 which is the direction away from the object 201 as illustrated in FIG. 6D, and this causes the object 201 to be hidden. In order to schematically illustrating that the object 201 is hidden, an area where the object 201 is supposed to be displayed is indicated by a broken line. The same goes for the following case, and when indicating that the object 201 is hidden, the area in which the object 201 is displayed is indicated by the broken line.

Here, it is defined whether the gaze position moves in "direction away from the object 201", for example, the left and right sides are defined as the horizontal direction and the top and bottom sides are defined as the vertical direction, so that the gaze position may be determined based on two vector components when the movement vector component of the gaze position is resolved into components in the horizontal direction and the vertical direction. For example, when the movement vector component of the gaze position is resolved into components in the horizontal direction and the vertical direction, and both of the movement vector component in the horizontal direction and of the movement vector component in the vertical direction have directions each away from the object 201, then it may be determined that the directions are "directions away from the object 201". For example, when either one of the movement vector component in the horizontal direction and the movement vector component in the vertical direction has a direction away from the object 201, then it may be determined that the direction is "direction away from the object 201". For example, when a longer moving distance is adopted, of the movement vector component in the horizontal direction and the movement vector component in the vertical direction, and when the direction is a direction away from the object 201, then it may be regarded that the gaze position moves in "direction away from the object 201". Moreover, the movement direction of the gaze position may be defined as eight directions with an azimuth interval of 45° instead of the four directions of left, right, up, and down with an azimuth interval of 90°, or the direction may further be subdivided.

Here, when a gaze path in a series of user's gaze movements is not linear but includes not less than a predetermined ratio of a curve portion or a bent portion, the movement direction of the gaze position or the vector is not constant. In this case, for example, an imaginary line connecting a start point at which the gaze movement is started and an end point at which a series of gaze movements is ended may be specified as a direction of the user's gaze movement. In addition, for example, when the series of gaze movements is estimated, an imaginary line connecting a start point and a point backward from the end point, by a predetermined section, at which the gaze movement is ended may be specified as a direction of the user's gaze movement.

When a change of the gaze position is not detected for a predetermined time or more after detection of the movement of the gaze position so that the object 201 is not displayed by a gaze movement not intended by the user, the object 201 may be displayed.

In this way, the electronic device 1 has a configuration that hides the first image when the gaze position separates from an area of the first image by a predetermined distance in the direction away from the first image while the first image is displayed. By having such a configuration, for example, when the user wants to compare the first image with other images or with a predetermined object in a scenery visually recognized through the display 20, repetition does not occur, such that the gaze position is out of the area of the first image and this causes the first image to be hidden or the gaze position again approaches the area of the first image and this causes the first image to be displayed again, and therefore it is easy to use.

Figure 7A:
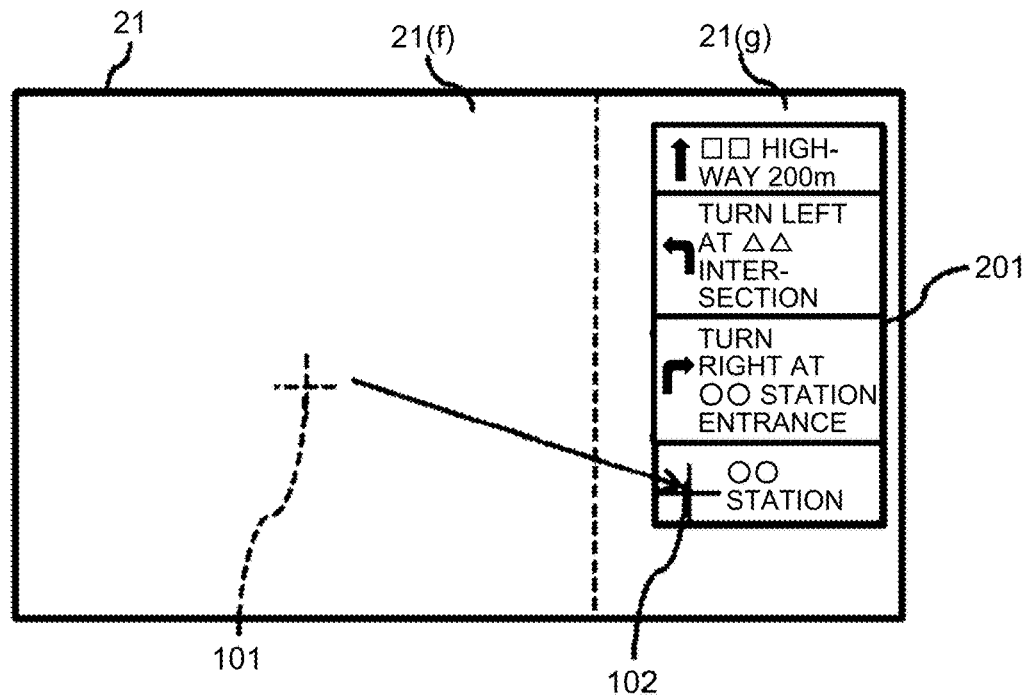
FIG. 7A is a diagram illustrating another example of the display mode of the display 20 of the electronic device 1.
Figure 7B:
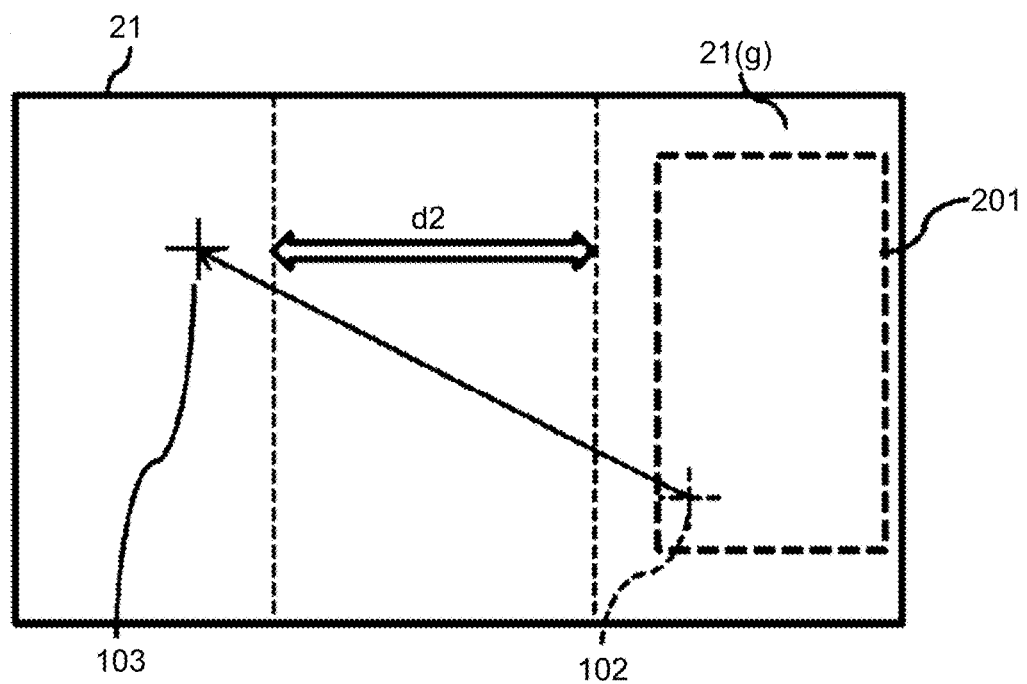
FIG. 7B is a diagram illustrating another example of the display mode of the display 20 of the electronic device 1.

Another display mode of the display 20 of the electronic device 1 will be explained next. FIG. 7A and FIG. 7B are diagrams illustrating another example of the display mode of the display 20 of the electronic device 1. In the examples illustrated in FIG. 7A and FIG. 7B, the display area 21 is divided by the broken line, and at least two areas of a first display area 21(*f*) and a second display area 21(*g*) obtained thereby are defined.

As illustrated in FIG. 7A, the controller 50 can estimate that the gaze position moves from the position 101 in the first display area 21(*f*) to the position 102 in the second display area 21(*g*), and this causes the first image as the object 201 to be displayed in the second display area 21(*g*). Incidentally, because the object 201 is not displayed before the gaze position is moved, which is the same state as the state illustrated in FIG. 6A, the figure is omitted.

As illustrated in FIG. 7B, the controller 50 can hide the object 201 when the gaze position separates from the second display area 21(*g*) by a predetermined distance d2 while the first image as the object 201 is displayed.

In this way, the electronic device 1 has a configuration that displays the first image in the second display area 21(*g*) when the gaze position moves from the first display area 21(*f*) to the second display area 21(*g*) in the display area 21. Therefore, it is possible to display useful information near the position visually recognized by the user in the display area 21. Moreover, the electronic device 1 has a configuration that hides the first image when the gaze position separates from the second display area 21(*g*) by the predetermined distance d2 while the first image is displayed. Therefore, the first image does not become non-display even when the gaze position moves outside the second display area 21(*g*) beyond the range of the second display area 21(*g*).

Figure 8A:
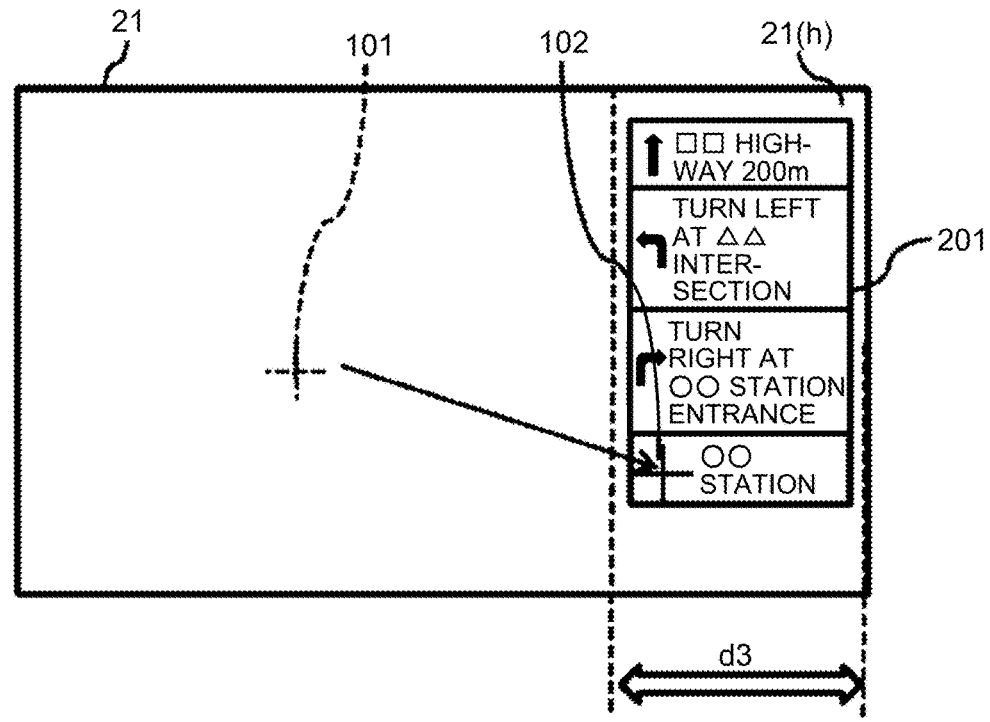
FIG. 8A is a diagram illustrating still another example of the display mode of the display 20 of the electronic device 1.
Figure 8B:
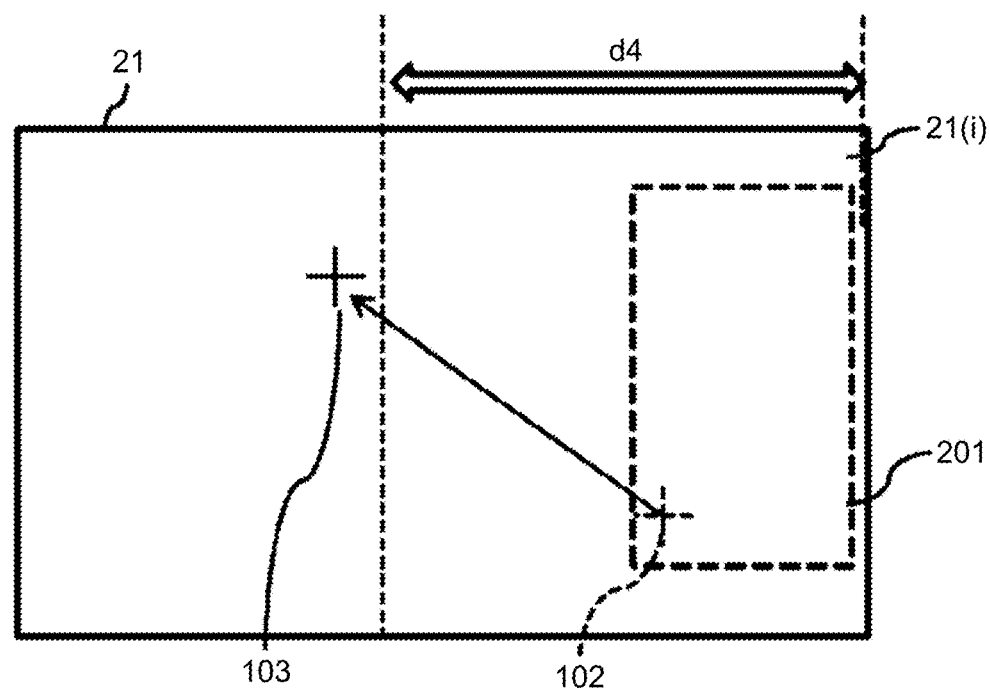
FIG. 8B is a diagram illustrating still another example of the display mode of the display 20 of the electronic device 1.

Still another display mode of the display 20 of the electronic device 1 will be explained next. FIG. 8A and FIG. 8B are diagrams illustrating still another example of the display mode of the display 20 of the electronic device 1. In the examples illustrated in FIG. 8A and FIG. 8B, a first range that displays the first image when the gaze position enters the first range and a second range that includes the first range and is larger that the first range are defined. The first range is an area 21(*h*) (illustrated in FIG. 8A) on the right side of the two areas which are separated by the broken line in the display area 21. The second range is an area 21(*i*) (illustrated in FIG. 8B) on the right side of the two areas which are separated by the broken line in the display area 21. In this way, the second range 21(*i*) includes the first range 21(*h*) and is larger than the first range 21(*h*).

As illustrated in FIG. 8A, the controller 50 can estimate that the gaze position moves from the outside of the first range 21(*h*) to the inside of the first range 21(*h*), and this causes the object 201 to be displayed in the first range 21(*h*). By having such a configuration, it is possible to display useful information near the position visually recognized by the user in the display area 21. Incidentally, because the object 201 is not displayed before the gaze position is moved, which is the same state as the state illustrated in FIG. 6A, the figure is omitted.

As illustrated in FIG. 8B, the controller 50 can hide the object 201 when the gaze position moves to the outside of the second range 21(*i*) while the object 201 is displayed. By having such a configuration, the first image does not become non-display even when the gaze position is slightly moved.

Figure 9A:
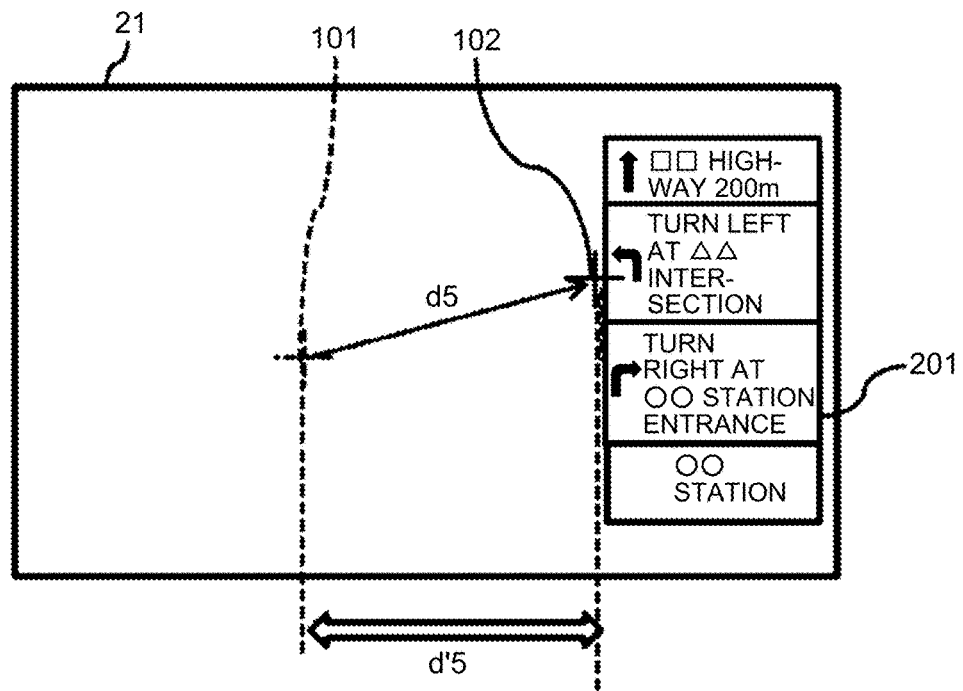
FIG. 9A is a diagram illustrating still another example of the display mode of the display 20 of the electronic device 1.
Figure 9B:
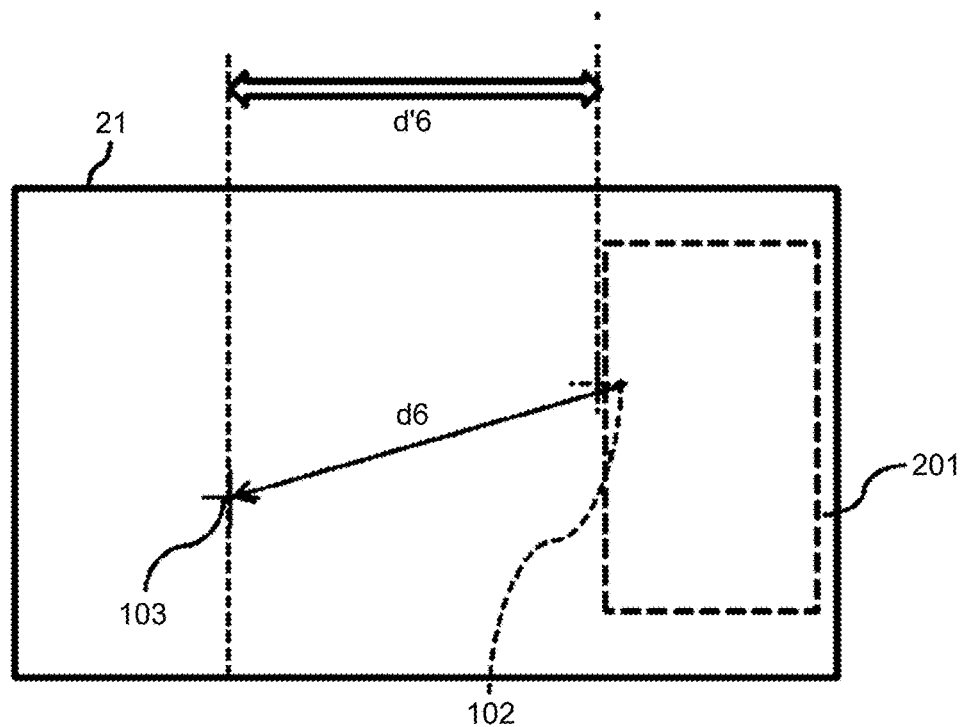
FIG. 9B is a diagram illustrating still another example of the display mode of the display 20 of the electronic device 1.

Still another display mode of the display 20 of the electronic device 1 will be explained next. FIG. 9A and FIG. 9B are diagrams illustrating still another examples of the display mode of the display 20 of the electronic device 1. As illustrated in FIG. 9A, the controller 50 can estimate that the gaze position moves from the position 101 to the position 102, and this causes the state of displaying the first image as the object 201 to be display in the display area 21. Incidentally, because the object 201 is not displayed before the gaze position is moved, which is the same state as the state illustrated in FIG. 6A, the figure is omitted.

The controller 50 can display the object 201 on the first direction side in the display area 21 in FIG. 9A based on the first direction which is a direction in which the gaze position moves from the position 101 to the position 102. At this time, the controller 50 can calculate a first distance which is a moving distance d5 in the first direction of the gaze position. The moving distance d5 may be set as, for example, a length of the imaginary line connecting the start point and the end point in a series of movements of the gaze position. It may be regarded that the series of movements of the gaze position is performed, for example, when estimation or detection of the gaze movement is started from the state where the gaze position is not changed for a predetermined time and when the gaze position is not changed for the predetermined time after the movement.

Then, as illustrated in FIG. 9B, the controller 50 can estimate a second distance, which is a moving distance d6, longer than the first distance being the moving distance d5 in a second direction which is an opposite direction to the first direction in which the gaze position moves in FIG. 9A while the first image as the object 201 is displayed, and this causes the object 201 to be hidden.

Moreover, instead of setting a movement direction of an actual gaze movement as the first direction, for example, it may be configured to define the movement direction as the four directions of left, right, up, and down, to resolve the vector component of the actual gaze movement into components in the four directions, and to define a direction, of the four directions, in which the moved component is the largest, as the first direction. In other words, referring to FIG. 9A and FIG. 9B, the controller 50 can resolve the movement vector of the gaze position from the position 101 to the position 102 into components in the four directions of left, right, up, and down, and extracts a rightward movement component which is a movement distance d'5 as the direction in which the moved component is the largest. On the other hand, when the movement of the gaze position is estimated or detected during the display of the object 201, the controller 50 can extract a leftward movement component which is a movement distance d'6 from the movement vector of the gaze position. The controller 50 can then compare the movement distance d'5 with the movement distance d'6, and hides the object 201 when the movement distance d'6 is larger than the movement distance d'5.

In this way, the electronic device 1 has a configuration that displays the first image on the first direction side in the display area 21 when the gaze position moves in the first direction by the first distance. Therefore, it is possible to display useful information near the position visually recognized by the user in the display area 21. Moreover, the electronic device 1 has a configuration that hides the first image when the gaze position moves in the second direction which is the opposite side to the first direction by the second distance longer than the first distance while the first image is displayed. Therefore, the first image does not become non-display even when the gaze position is moved.

Figure 10A:
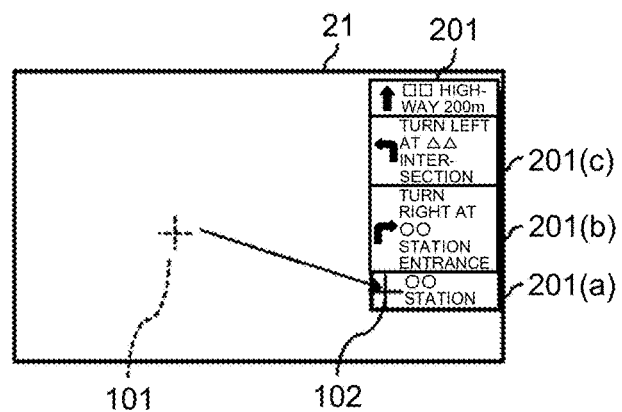
FIG. 10A is a diagram illustrating still another example of the display mode of the display 20 of the electronic device 1.

Still another display mode of the display 20 of the electronic device 1 will be explained next. FIG. 10A, FIG. 10B, FIG. 10C, and FIG. 10D are diagrams illustrating still another example of the display mode of the display 20 of the electronic device 1. FIG. 10A represents a state in which the controller 50 can determine the movement of the gaze position from the position 101 to the position 102 and this causes the first image as the object 201 to be displayed in the display area 21. As conditions of gaze movement to display the object 201, any one of the examples illustrated in FIG. 6A, FIG. 6B, FIG. 6C, FIG. 6D, FIG. 7A, FIG. 7B, FIG. 8A, FIG. 8B, FIG. 9A, and FIG. 9B may be adopted. In other words, the examples illustrated in FIG. 10A, FIG. 10B, FIG. 10C, and FIG. 10D can be combined with any one of the examples illustrated in FIG. 6A, FIG. 6B, FIG. 6C, FIG. 6D, FIG. 7A, FIG. 7B, FIG. 8A, FIG. 8B, FIG. 9A, and FIG. 9B. As illustrated in FIG. 10A, during display of the object 201, the gaze position 102 is put on the object 201, for example, a display area 201(*a*) indicating a departure point "OO Station" arbitrarily set by the user in the image for providing walking guidance to the user.

Figure 10B:
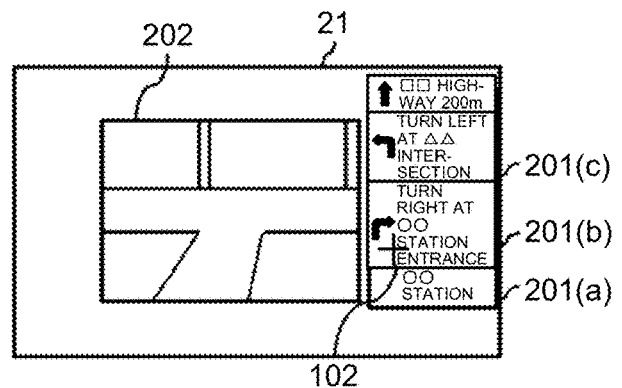
FIG. 10B is a diagram illustrating still another example of the display mode of the display 20 of the electronic device 1.

Then, as illustrated in FIG. 10B, when the gaze position moves from the display area 201(*a*) to a display area 201(*b*), for example, an area that presents a guide point on the route such as a corner, then a display content of the display area 201(*b*) is displayed, for example, an object 202 with the direction to be turned superimposed on an actual scenic photo or a second image which is a mere map image, which is related to the information on the corner is displayed. In other words, the controller 50 can display the second image as the object 202 related to the first image as the object 201 in an area other than the area of the first image as the object 201 in the display area 21.

Figure 10C:
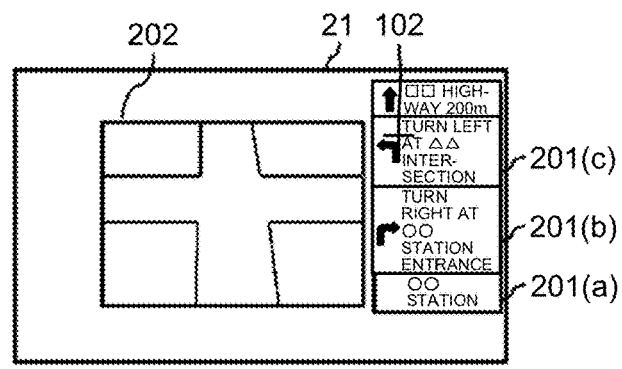
FIG. 10C is a diagram illustrating still another example of the display mode of the display 20 of the electronic device 1.

As illustrated in FIG. 10C, when the gaze position moves from the display area 201(*b*) to a display area 201(*c*), for example, to a next guide point of the guide point illustrated in the display area 201(*b*), the display content of the second image as the object 202 is changed from the content related to the display area 201(*b*) to the content related to the display area 201(*c*).

At this time, in the first image as the object 202, it may be configured to change the display content of the second image as the object 202 when the gaze position moves in a direction crossing the first direction which is the direction when the gaze position moves from the position 101 to the position 102, i.e., to a direction corresponding to the first direction in the example illustrated in FIG. 6B. In other words, as is the example illustrated in FIG. 6B, when the object 201 is to be displayed on the first direction side which is the right direction side in the display area 21 based on the first direction in FIG. 6B, which is the movement direction of the determined gaze position, it may be configured to change the display content of the second image as the object 202 based on the vertical movement of the gaze position which is the direction crossing the first direction. This configuration avoids an erroneous change of the display content of the second image as the object 202 due to gaze movement for displaying the first image as the object 201.

The configuration that changes the display content of the second image as the object 202 depending on a gaze operation is not always required. For example, it may be a configuration that changes the display content of the second image as the object 202 according to a predetermined contact operation for the operation unit 30 while the second image as the object 202 is displayed.

In the example illustrated in FIG. 6D, the "predetermined distance" may be set based on the size of the second image as the object 202 in the configuration that hides the first image when the gaze position separates from the area of the first image by the predetermined distance d1 toward the direction away from the first image as the object 201.

The "predetermined distance" may be set based on the size of the second image as the object 202 in the configuration that displays the first image as the object 201 in the second area 21(*g*) when the gaze position moves from the first display area 21(*f*) to the second display area 21(*g*) in the display area 21 in the example illustrated in FIG. 7A, and that hides the first image when the gaze position separates from the second area 21(*g*) by the predetermined distance d2 in the example illustrated in FIG. 7B.

Figure 10D:
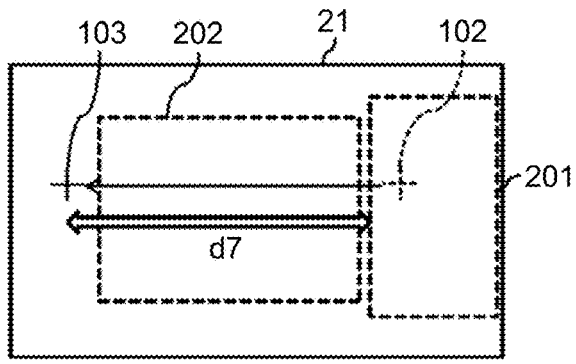
FIG. 10D is a diagram illustrating still another example of the display mode of the display 20 of the electronic device 1.

For example, as illustrated in FIG. 10D, it may be configured to set a length as a predetermined distance d7, which corresponds to a length such that the gaze position moves to a position away from the first image as the object 201 beyond the second image as the object 202.

The predetermined distance may be changed according to the display content displayed as the second image as the object 202. For example, when the display content of the second image as the object 202 contains character information at a predetermined ratio or more, the predetermined distance may be set longer as compared with a case where the display content contains character information less than the predetermined ratio. When the user visually recognizes the second image as the object 202 and if the second image as the object 202 is only an image without including character information, the user can grasp the outline even if viewing only a part of the image close to the first image as the object 201. In other words, in this case, the user can grasp the outline by a short-distance gaze movement. When the object 202 is a desired display content as a result of visually recognizing the part of the second image as the object 202, the user returns the eyes to the first image as the object 201, and then performs Pattern 4 in FIG. 5, for example, multiple blinks, so that the display content of the object 202 may be selected/decided or the display of the object 202 may be maintained or the like. On the other hand, when the second image as the object 202 contains character information, a wide-range gaze movement may be needed in order to grasp the outline. In other words, a long-distance gaze movement is required in order to grasp the outline. In this case, if the predetermined distance of the gaze movement distance required for hiding the first image as the object 201 is short, the eyes are moved so as to grasp the outline of the second image as the object 202 and this causes the first image as the object 201 to be hidden, which may result in a troublesome operation.

As described above, there is a possibility that an appropriate predetermined distance of the gaze movement distance required for hiding the first image as the object 201 may differ depending on whether the display content of the second image as the object 202 contains character information or on how much the character information is contained therein. On the other hand, in the electronic device 1, the gaze movement distance required for hiding the first image as the object 201 may be changed appropriately depending on whether the display content of the second image as the object 202 contains character information or on how much the character information is contained therein. Therefore, it is possible to realize a gaze movement operation that does not make the user feel troublesome.

In addition, the predetermined distance may be settable by the user.

Although the present application has been explained based on the drawings and the embodiments, the present application is not limited thereto. For example, the electronic device may be configured to include the display, the detector for detecting a user's gaze movement, and the controller for estimating a user's gaze position in the display area of the display based on the detection result of the detector, and to display the first image on the predetermined direction side in the display area when the gaze position moves in the predetermined direction. When the ratio of the area of the first image to the display area of the display is less than the predetermined value, it may be configured to hide the first image when the gaze position separates from the area of the first image by a predetermined distance. Moreover, when the ratio of the area of the first image to the display area of the display is not less than the predetermined value, it may be configured to hide the first image when the gaze position moves from inside to outside of the area of the first image.

Here, the case where the ratio of the area of the first image to the display area of the display is not less than the predetermined value is, for example, a case where the ratio of the area of the first image to the display area of the display is equal to or larger than 50% and the area includes the central region of the display area.

In the embodiments, although the configuration that displays the first image based on the movement of the gaze position has been explained, the configuration is not limited thereto. For example, it may be configured to display the first image related to predetermined information when the information is received through communication with an external device. In addition, the first image may be always displayed.

In the embodiments, the configuration that hides the first image based on the movement of the gaze position has been explained. The electronic device 1 disclosed in the present specification may further includes, in addition to such a configuration, a configuration that hides the first image after the elapse of a predetermined period of time since the display of the first image.

Although the present application has been explained with reference to the drawings and the embodiments, it should be noted that those skilled in the art can easily make various modifications and amendments based on the present disclosure. It is therefore to be noted that these modifications and amendments should be included in the scope of the present disclosure. Moreover, all the technical matters disclosed in the present application are relocatable so as not to conflict with each other, and it is possible to combine a plurality of components into one unit or to divide the components into units.

Figure 11A:
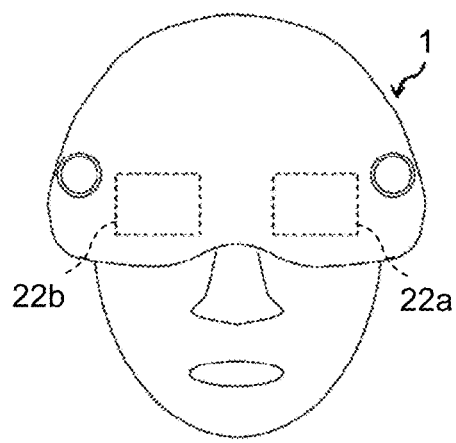
FIG. 11A is a diagram illustrating an example of another shape of the electronic device 1.
Figure 11B:
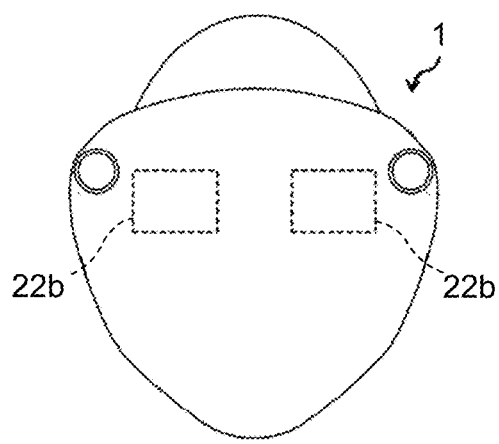
FIG. 11B is a diagram illustrating an example of still another shape of the electronic device 1.

In the embodiments, the example in which the electronic device 1 has the shape such as the eyeglass shape or the goggle shape has been explained, however, the shape of the electronic device 1 is not limited thereto. For example, as illustrated in FIG. 11A, the electronic device 1 may have the shape of a helmet type that covers substantially the upper half of the user's head. Alternatively, as illustrated in FIG. 11B, the electronic device 1 may have the shape of a mask type that covers substantially the whole of the user's face.

In the embodiments, the configuration in which the display 20 has the pair of display parts 20a and 20b provided in front of the user's right and left eyes has been represented, however, the embodiments are not limited thereto. It may be configured that the display 20 has one display part provided in front of either one of the user's right and left eyes.

In the embodiments, the configuration in which the marginal parts of the front part enclose the entire periphery of the edge of the display area 21 of the display 20 has been represented. However, the embodiments are not limited thereto, and it may be configured so that the marginal part surrounds only part of the edge of the display area 21 in the display 20.

The invention claimed is:

1. An electronic device, comprising:
a display configured to
allow a user of the electronic device to see a view through the display, and
display an image; and
a controller configured to determine a user's gaze position in a display area of the display, wherein
the controller is configured to cause the display to display a first image in a state where at least a part of a region of the display area is in a transparent state, and when the first image is displayed in the display area,
in response to the user's gaze position moving to a first region in the first image, cause the display to display a second image having a display content relating to the first region in the display area without overlapping the first image, and
in response to the user's gaze position moving from the first region to a second region in the first image, the controller is configured to change the display content of the second image to a display content relating to the second region in the display area.

2. The electronic device according to claim 1, wherein in response to the controller determining that the user's gaze position moving in a first direction, the controller is configured to cause the display to display the first image at a side of the first direction in the display area in a state where at least a part of the region of the display area is in the transparent state.

3. The electronic device according to claim 2, wherein in response to the user's gaze position being separated from the first image, the controller is configured to hide the first image.

4. A display method, comprising:
displaying a first image on a display in a state where at least a part of a region of a display area of the display is in a transparent state;
determining a user's gaze position in the display area of the display; and
when the first image is displayed in the display area,
in response to the user's gaze position in the display area moving to a first region in the first image, displaying a second image having a display content relating to the first region in the display area overlapping the first image, and
in response to the user's gaze position moving from the first region to a second region in the first image, changing the display content of the second image to a display content relating to the second region in the display area.

* * * * *